No. 808,765. PATENTED JAN. 2, 1906.
J. LEDWINKA.
WHEEL STRUCTURE.
APPLICATION FILED SEPT. 10, 1904.

WITNESSES:
D. T. Davies
E. M. Norling

INVENTOR:
Joseph Ledwinka
by his attorney
J. B. Fay.

UNITED STATES PATENT OFFICE.

JOSEPH LEDWINKA, OF DETROIT, MICHIGAN, ASSIGNOR OF ONE-HALF TO CHARLES BERG, OF CLEVELAND, OHIO.

WHEEL STRUCTURE.

No. 808,765.     Specification of Letters Patent.     Patented Jan. 2, 1906.

Application filed September 10, 1904. Serial No. 223,956.

*To all whom it may concern:*

Be it known that I, JOSEPH LEDWINKA, a subject of the Emperor of Austria-Hungary, and a resident of Detroit, county of Wayne, State of Michigan, have invented a new and useful Improvement in Wheel Structures, of which the following is a specification, the principle of the invention being herein explained and the best mode in which I have contemplated applying that principle, so as to distinguish it from other inventions.

My invention relates to wheel structures, and particularly to wheel structures for use in connection with automobiles and embodying wooden tires.

The object of the invention is to provide a wheel structure of said character in which the wooden tire may be so constructed and arranged as to impart thereto a long life and the greatest possible durability.

Said invention consists of means hereinafter fully described, and particularly set forth in the claims.

The annexed drawings and the following description set forth in detail certain means embodying my invention, the disclosed means, however, constituting but one of various forms in which the principle of my invention may be used.

Figure 1:
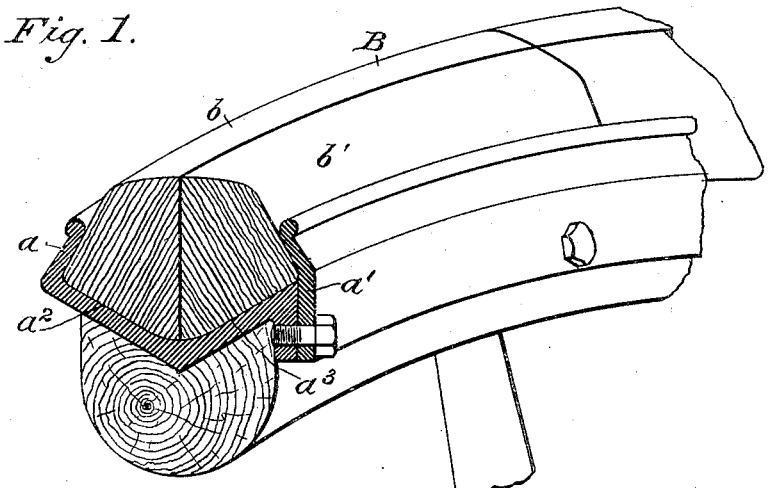
Figure 2:
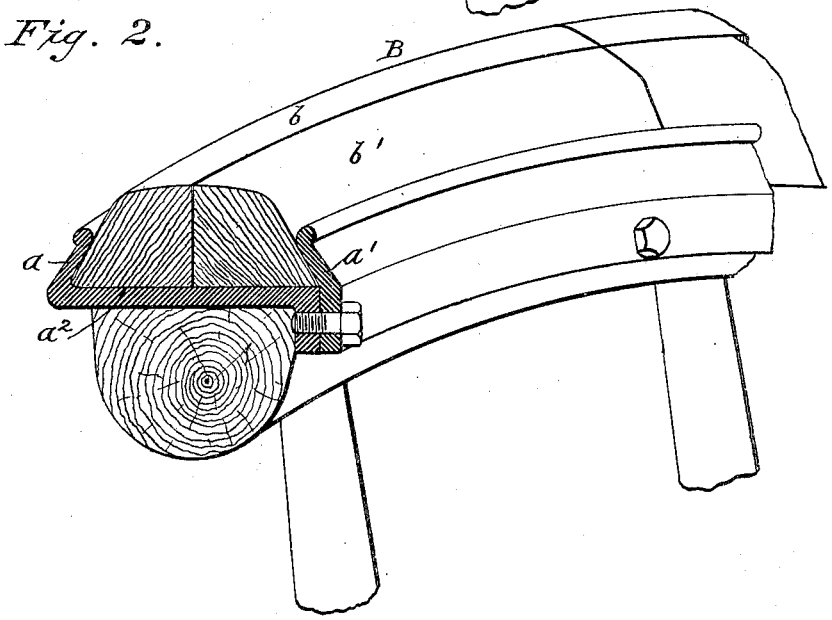

In said annexed drawings, Figure 1 represents a perspective view of a portion of a wheel structure embodying my invention. Fig. 2 represents a similar view of a modified form of such structure.

The felly or rim of the wheel is formed with two flanges $a$ $a'$, flange $a'$ being removable and secured to the main body of the wheel by means of bolts and nuts, as will be readily understood from the drawings. The flanges incline inwardly toward each other to form a tire-space contracted at its outer portion, as shown. Seated in the tire-space is the tire B, consisting of a plurality of sections separated from each other upon planes passing through the axis of the wheel. These sections are readily removed and replaced by means of the detachable flange $a'$. Each section B consists of two parts of equal volume $b$ $b'$, each part having an inner abutting face lying in a central plane perpendicular to the axis of the wheel. These parts consist of fibrous material, such as suitably-selected wood having parallel fibers, and are cut so as to cause the fibers of the one part $b$ to incline toward the said central plane of the inner abutting face thereof, the fibers terminating at the bottom or inner part of the tire opposite the face of the felly. This arrangement brings each fiber substantially in a plane passing through the wheel-axis. The fibers of the part $b'$ are similarly inclined, but in the opposite direction, as shown. Each section B is constructed similar to that above described.

By means of the above-described construction and arrangement of grain or fiber of the material the lateral overlapping of the wood when subjected to the pressure upon the pavement is overcome and prevented. This characteristic makes the above-described tire construction particularly adaptable for use in wheels utilized in connection with trucks designed to carry heavy loads. In Fig. 1 I have illustrated a felly construction in which the face of the felly is formed with two downwardly and inwardly inclined surfaces $a^2$ $a^3$, which are of an inclination such as to present a surface perpendicular to the fibers of the respective parts of the tire-sections, such construction tending to still further maintain the normal cross-section of the tire. In Fig. 2 I have shown a felly construction in which the face of the felly is cylindrical.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In a wheel structure, the combination with a suitable rim, of a tire secured thereto and consisting of fibrous material divided into two sections in a plane transverse relatively to the wheel-axis, the fibers of the one portion being inclined, with reference to said plane, in one direction and the fibers of the other portion being inclined in the other direction, said two sections forming the complete tire.

2. In a wheel structure, the combination with a rim having a base-surface consisting of two inwardly-inclined surfaces, of a tire secured thereto resting against said surfaces and consisting of fibrous material divided into two sections on a plane transverse relatively to the wheel-axis, the fibers of each section being substantially perpendicular to the contiguous inclined surfaces of the rim respectively.

3. The wheel structure shown and described consisting of the combination with a suitable rim, of the fibrous tire consisting of the two sections forming the complete tire and separated from each other in a plane transverse relatively to the wheel-axis, said sections having their fibers converging in an outward direction.

Signed by me this 30th day of August, 1904.

JOSEPH LEDWINKA.

Attest:
    E. M. NORLING,
    A. E. MERKEL.